(12) United States Patent
Nowosielski et al.

(10) Patent No.: US 12,507,872 B2
(45) Date of Patent: Dec. 30, 2025

(54) ENDOSCOPE ASSEMBLY, ENDOSCOPIC CAMERA ASSEMBLY AND ENDOSCOPY DEVICE

(71) Applicant: Laparo Sp. Z o.o., Wroclaw (PL)

(72) Inventors: Radoslaw Nowosielski, Wroclaw (PL); Jaroslaw Perczak, Czestochowa (PL)

(73) Assignee: Laparo Sp. Z o.o., Wroclaw (PL)

( * ) Notice: Subject to any disclaimer, the term of this patent is extended or adjusted under 35 U.S.C. 154(b) by 407 days.

(21) Appl. No.: 18/172,657

(22) Filed: Feb. 22, 2023

(65) Prior Publication Data
US 2024/0268639 A1    Aug. 15, 2024

(30) Foreign Application Priority Data

Feb. 13, 2023    (EP) .................................. 23461515

(51) Int. Cl.
*A61B 1/00*    (2006.01)
*A61B 1/04*    (2006.01)

(52) U.S. Cl.
CPC ...... *A61B 1/00183* (2013.01); *A61B 1/00096* (2013.01); *A61B 1/00126* (2013.01); *A61B 1/042* (2013.01)

(58) Field of Classification Search
CPC ............ A61B 1/00066; A61B 1/00096; A61B 1/00126; A61B 1/00183; A61B 1/042
USPC .......................................................... 600/137
See application file for complete search history.

(56) References Cited

U.S. PATENT DOCUMENTS

| | | | |
|---|---|---|---|
| 2002/0022767 A1* | 2/2002 | Dohi ...................... | A61B 1/042 600/137 |
| 2006/0206006 A1* | 9/2006 | Schara ............... | A61B 1/00183 600/173 |
| 2007/0066104 A1* | 3/2007 | Kura ....................... | A61B 1/04 439/157 |
| 2019/0208143 A1* | 7/2019 | Brooks .............. | A61B 1/00183 |
| 2019/0355278 A1 | 11/2019 | Sainsbury et al. | |
| 2022/0139260 A1 | 5/2022 | Henschel et al. | |

FOREIGN PATENT DOCUMENTS

EP          1504431 A1    2/2005
WO     03/096307 A1    11/2003

\* cited by examiner

*Primary Examiner* — Aaron B Fairchild

(57) ABSTRACT

The aspects of the disclosed embodiments provide training simulators intended for training endoscope operation skills. Training may be carried out with the use of training inserts or using virtual reality technology. An endoscopy device comprises an endoscope assembly and an endoscopic camera assembly. The endoscope of the endoscope assembly is configured to be connected to an optical adapter of the endoscopic camera assembly via an eyepiece protection window so that the endoscope may rotate freely about its own axis. The training simulator may measure parameters of the camera sharpness and parameters of the endoscope rotation relative to the camera.

7 Claims, 4 Drawing Sheets

ENDOSCOPE ASSEMBLY, ENDOSCOPIC CAMERA ASSEMBLY AND ENDOSCOPY DEVICE

FIELD

The aspects of the disclosed embodiments pertain to the field of training simulators intended for training endoscope operating skills. Training may be carried out with the use of training inserts or with the use of virtual reality technology.

PRIOR ART

Presently there are known simulators for training laparoscopy procedures using virtual and augmented reality.

In training of minimally invasive surgery it is highly important to train skills in operating an endoscopy camera. A standard endoscopy set comprises a camera, an optical adapter and an endoscope. The camera is connected to the optical adapter and the endoscope may rotate about the adapter. For angular endoscopes, their rotation about their own axis relative to the camera causes that the surgeon may inspect visually hardly accessible sites during the surgical procedure, while maintaining orientation and coordination with the camera image. Skills in proper operation of such angular endoscope are critical in particular at the initial stage of training of endoscopy surgery. Additionally, the operator of the camera should take care to ensure always sharp image from the camera.

A training system for training skills in operating an endoscopy camera may be executed in virtual reality. The image captured by the camera is then computer-simulated. Training may be also carried out with the use of training inserts comprising respective exercises. In both cases it is required to measure key parameters for the endoscopy camera—the rotation angle of the endoscope relative to the camera and the angle of the image sharpness adjustment knob.

Application EP1504431A1 teaches a laparoscope simulator, comprising an apparatus in a shape of a human body through which the laparoscopy instrument is inserted. Cameras capture video image and a graphics engine uses 3D data to generate representation of the internal scenes. The simulator uses a motion analysis engine for monitoring the instrument to determine the extent of rotation about the axis. The instrument additionally has conical markings that enable monitoring the rotation and the depth at which the instrument is inserted.

Application U.S. Pat. No. 20220139260A1 teaches a simulator and a simulation system in virtual and augmented reality, in particular for endoscopy simulators. Additionally, the system comprises a sensor in the rotary element or uses two cameras for detection of orientation of the anatomic model.

Application U.S. Pat. No. 20190355278A1 teaches s surgical system in virtual reality, with a haptic feedback coupling. The system comprises a tool rotation sensor assembly comprising a code wheel with lines arranged thereon and PCBs configured to measure rotations of the code wheel based on the measured lines.

In the prior art there exist several commercial solutions concerning laparoscopy training simulators using virtual and augmented reality and additionally using sensors for measuring endoscope camera rotation angle. But these laparoscopes are not provided with a set of sensors for measuring laparoscope rotation or sharpness level.

The aspects of the disclosed embodiments are directed to providing a training simulator that may measure parameters of camera sharpness and parameters of endoscope rotation relative to the camera.

SUMMARY

The subject-matter of the invention provides an endoscope assembly comprising an endoscope comprising preferably a fiber optic connection and an endoscope housing. The endoscope assembly is characterized in that it further comprises an endoscope rotation measurement assembly which is arranged within the housing of the endoscope. On the endoscope a toothed wheel is mounted fixedly, said toothed wheel being configured to cooperate with a movable toothed wheel. The movable toothed wheel is seated at the first end of a shaft, the shaft being seated in the housing rotatably. Preferably, it is seated via a bearing. The measurement assembly of the endoscope comprises a rotation sensor configured to measure shaft rotation, and furthermore the endoscope rotation measurement assembly comprises an endoscope interface, preferably in a form of an endoscope connector configured to transfer data from the rotation sensor. Preferably, the endoscope housing comprises a protrusion.

Preferably, the toothed wheel and the movable toothed wheel are oblique wheels, and more preferably the axis of the toothed wheel and the axis of the movable toothed wheel define the right angle.

Preferably, the rotation sensor comprises an encoder and a magnet arranged on the other end of the shaft.

Preferably, it comprises an endoscope printed circuit which comprises an encoder and an endoscope interface.

Preferably, it comprises a mechanism for elimination of play between the toothed wheel and the movable toothed wheel. The play elimination mechanism comprises a spring, more preferably a spiral spring capable to apply torque to the shaft and the housing, and even more preferably between the spring and the shaft there is arranged a mounting pin to which the spring is mounted.

Preferably, the central axis of the field of view of the endoscope is parallel or angled relative to the endoscope axis.

Preferably, the endoscope housing comprises a rotation limiting mechanism to prevent the endoscope from rotating a full turn about its own axis relative to the housing, more preferably in a form of an arm mounted perpendicularly to the endoscope axis and an element parallel to the endoscope and protruding above the arm, and more preferably the arm is a fiber optic connection.

One aspect of the disclosed embodiments is directed to an endoscopic camera assembly comprising a camera housing comprising a sensor case of a vision sensor, the vision sensor being positioned preferably on the sensor printed circuit of the vision sensor;

a camera interface configured to transfer data from the endoscopic camera assembly, preferably in a form of a camera connector. The endoscopic camera assembly is characterized in that the optical adapter is configured to be connected to the endoscope assembly and to prevent the endoscope assembly from rotating relative to the endoscope axis, preferably by means of a shaped connection with a protrusion of the endoscope assembly so that the image from the endoscope is captured by the vision sensor. On the optical adapter an adapter case is fixedly applied. The optical adapter comprises a sharpness adjustment knob. The endoscopic camera assembly comprises an assembly for measuring position of the sharpness adjustment knob. The endoscopic camera assembly preferably comprises an accelerometer.

Preferably, the assembly for measuring position of the sharpness adjustment knob comprises a reflector and a knob position sensor configured to read out the reflector position.

Preferably, the knob position sensor is arranged in the adapter case, and more preferably the knob position sensor and/or accelerometer are seated on the optical adapter printed circuit.

Preferably, it comprises an adapter interface capable to receive data from the endoscope interface and to transfer the received data to the camera interface, preferably the adapter interface being positioned on the optical adapter printed circuit.

Preferably, the reflector is positioned on the sidewall of the sharpness adjustment knob.

Preferably, the reflector is a sticker with variable optical parameters or a furrow with variable depth along a section of a circle.

Preferably, the camera housing comprises camera press buttons configured to control vision sensor parameters and functions, preferably the camera press buttons are positioned on the camera printed circuit, more preferably an accelerometer is mounted on the printed circuit.

Preferably, the camera connector is positioned within the adapter case or on the camera housing.

Another aspect of the disclosed embodiments is directed to an endoscopy device that comprises an endoscope assembly and an endoscopic camera assembly, where the endoscope of the endoscope assembly is configured co be connected to an optical adapter of the endoscopic camera assembly via a protection window of the eyepiece so that the endoscope may rotate freely about its own axis.

BRIEF DESCRIPTION OF THE DRAWINGS

The invention will be presented more in detail in a preferable embodiment with reference to the enclosed drawings where.

REFERENCE NUMERALS

Figure 1:
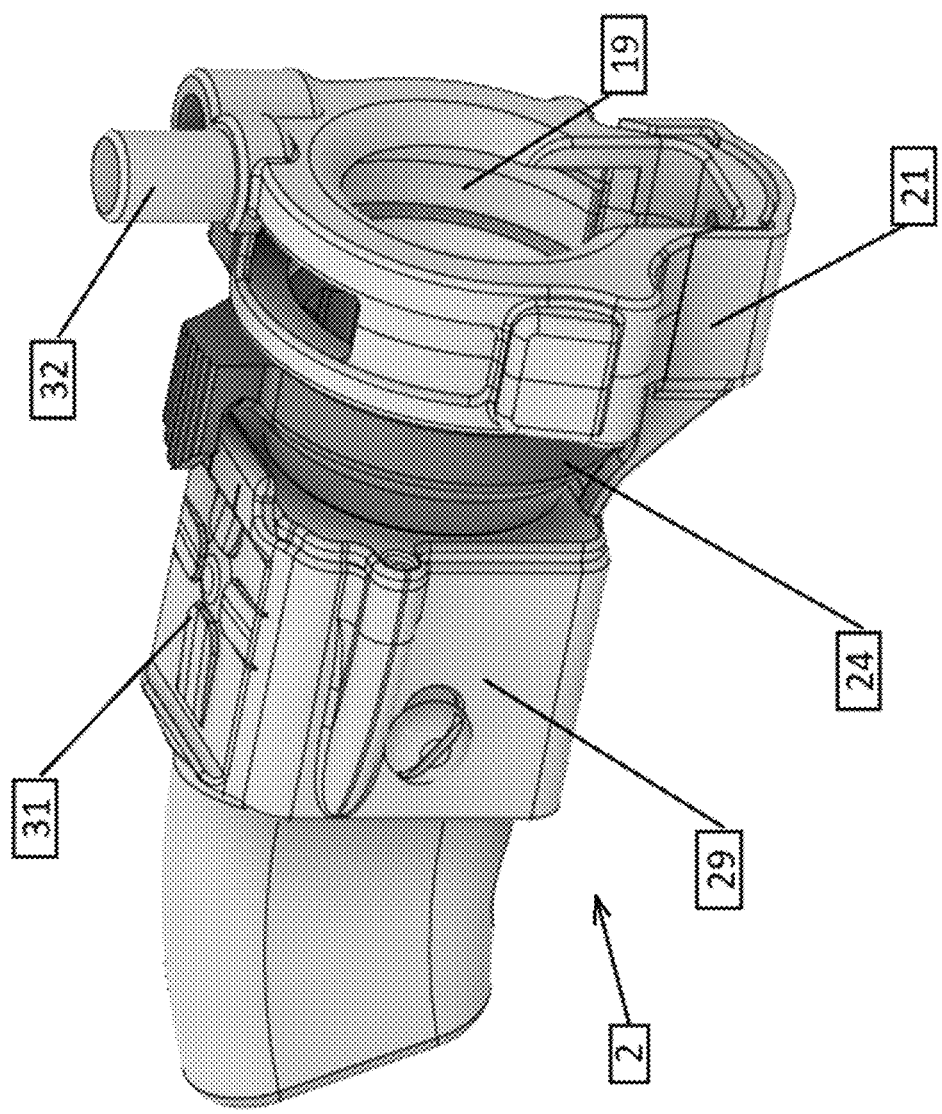
FIG. 1 shows an axonometric view of a sensor-equipped endoscope.

1. Endoscope assembly
2. Endoscopic camera assembly
3. Endoscope
4. Fiber optic connection
5. Eyepiece protection window
6. Endoscope housing
7. Rotation stop
8. Protrusion
9. Toothed wheel
10. Movable toothed wheel
11. Mounting pin
12. Spring
13. Shaft
14. Magnet
15. Bearing
16. Endoscope printed circuit
17. Encoder
18. Endoscope connector
19. Optical adapter
20. Sharpness adjustment knob
21. Adapter case
22. Adapter printed circuit
23. Knob position sensor
24. Sharpness adjustment knob cap
25. Reflector
26. Sensor case
27. Vision sensor printed circuit
28. Vision sensor
29. Camera housing
30. Camera printed circuit
31. Camera press buttons
32. Camera connector

DETAILED DESCRIPTION

The aspects of the disclosed embodiments are directed to an endoscope assembly 1, and endoscopic camera assembly 2, and an endoscopy device comprising the endoscope assembly 1 and the endoscope camera 2, with the use of virtual and augmented reality for laparoscopy training.

Figure 2:
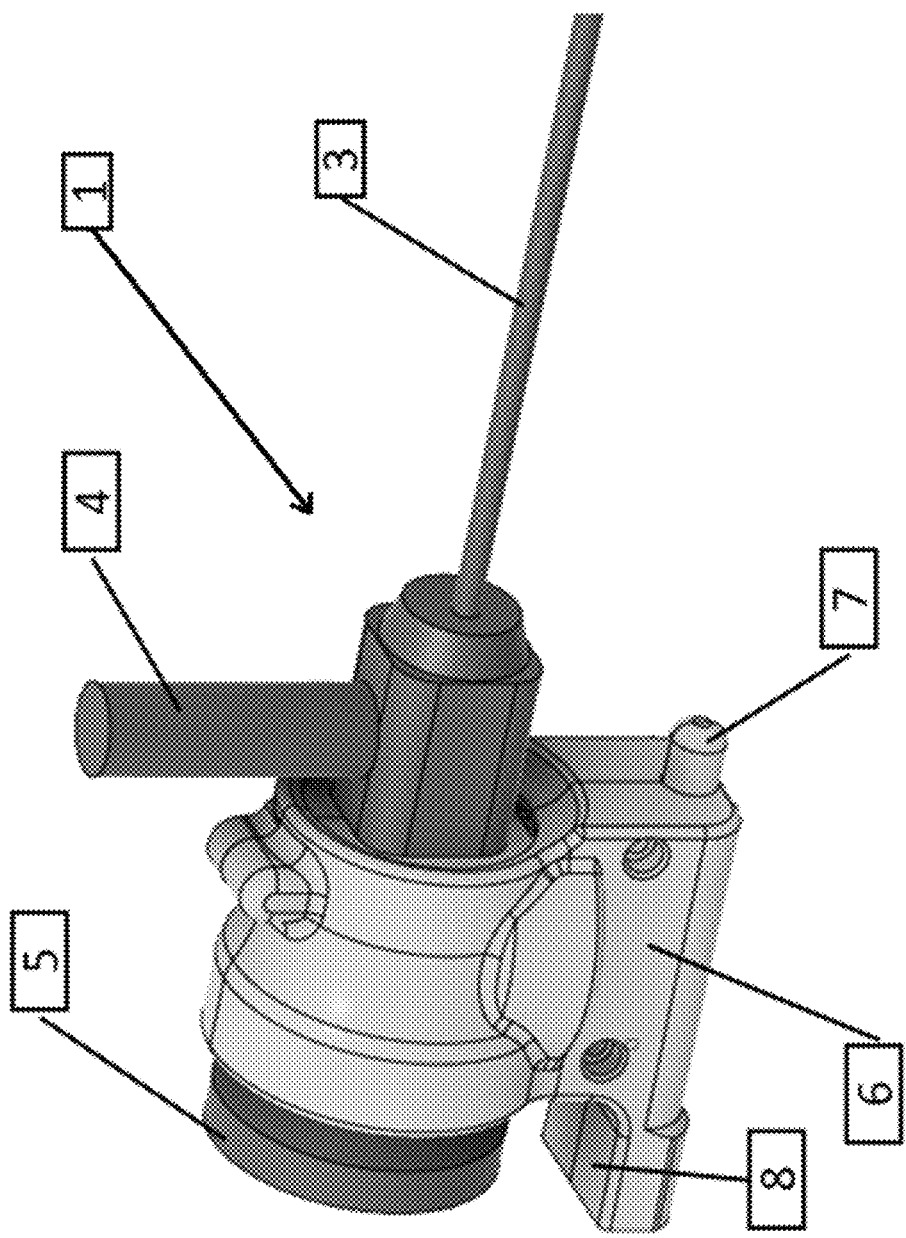
FIG. 2 shows an axonometric view of a sensor-equipped endoscope camera.
Figure 3:
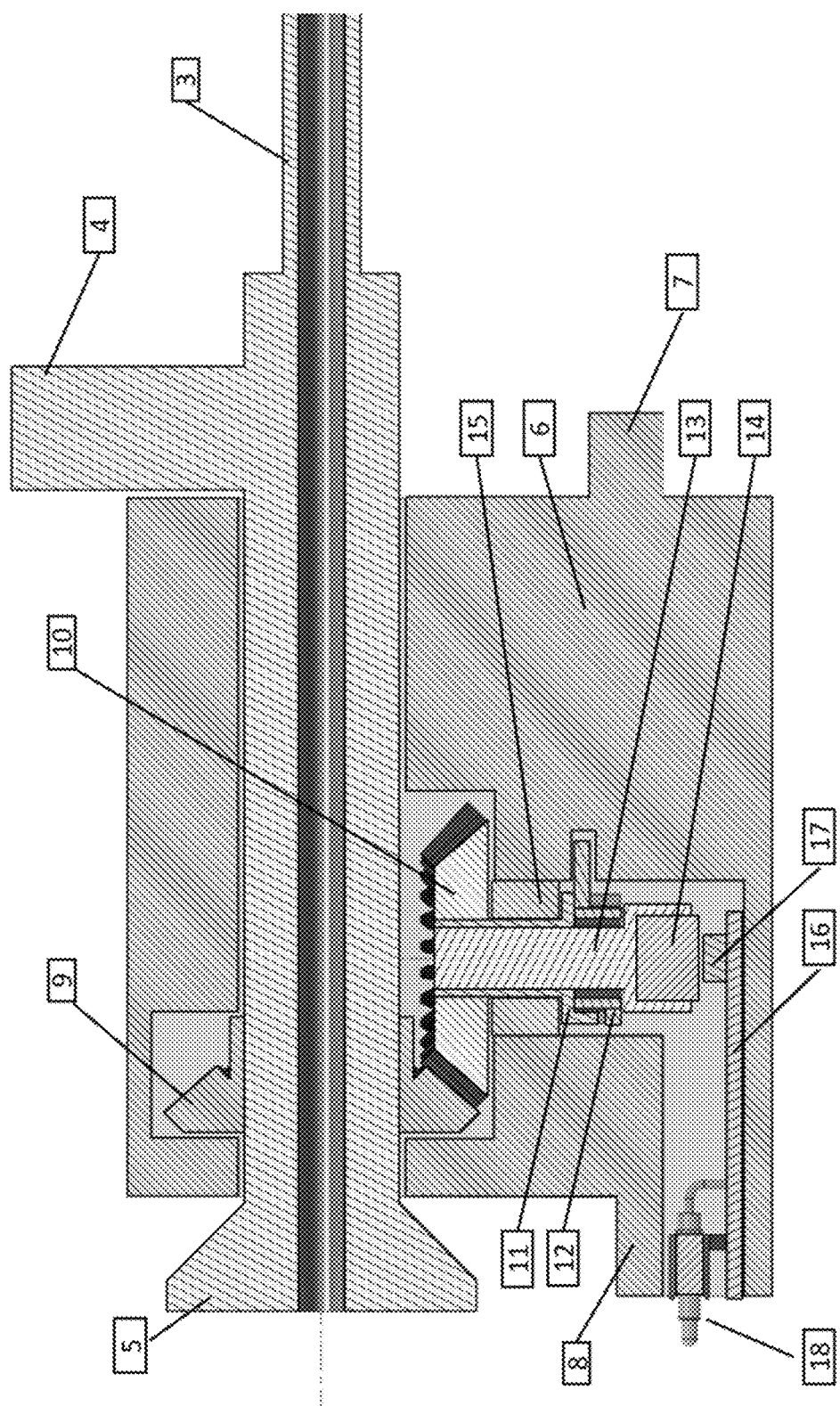
FIG. 3 shows a cross section of the sensor-equipped endoscope.

The aspects of the disclosed embodiments are built of two main elements—an endoscope assembly 1 (FIG. 1 and FIG. 3) and an endoscopic camera assembly 2 (FIG. 2). These parts are separable as under the conditions of minimally invasive surgical procedure.

Figure 4:
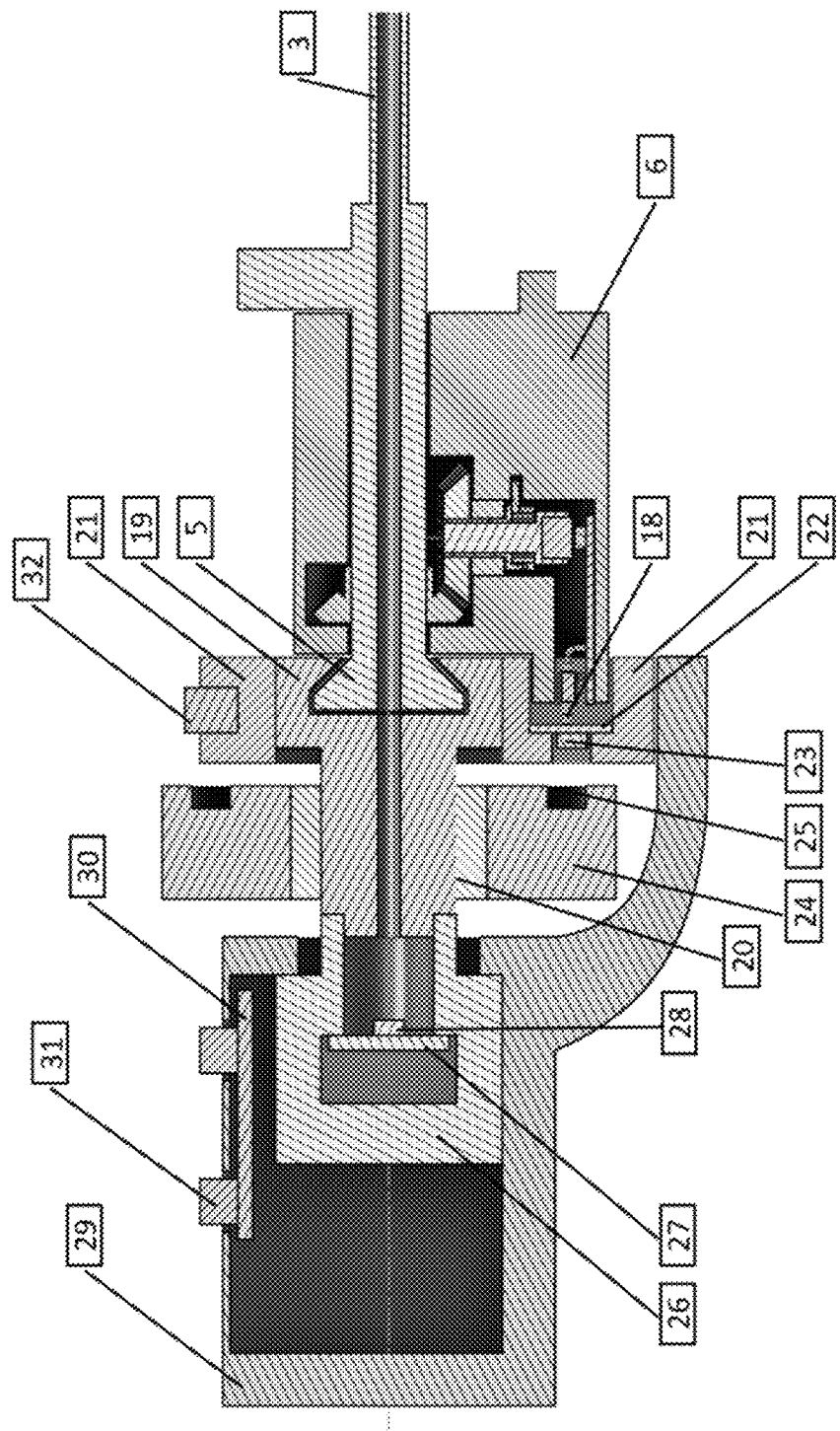
FIG. 4 shows a cross section of the assembled endoscope and endoscope camera.

Endoscope 3 is configured to be connected to an optical adapter 19 via an eyepiece protection window 5 to enable rotation thereof about its own axis (exemplary implementation of such connection is shown in FIG. 4). The endoscope assembly 1 and the endoscopic camera assembly 2 are connected to each other in a manner that prevents their relative rotation, e.g. by a shaped connection. Operator is able to change the optics of the endoscope 3 into the optics of the central axis of the field of view of the endoscope 3 which is parallel or inclined at an angle to the axis of the endoscope 3. The endoscope 3 may rotate about the optical axis relative to the housing 6 of the endoscope 3.

The endoscope assembly 1 comprises an endoscope 3, comprising preferably a fiber optic connection 4, a housing 6 of the endoscope 3 and a system for measuring rotation of the endoscope 3 poisoned within the housing 6 of the endoscope 3. The system of measurement of rotation of the endoscope 3 is positioned within the housing 6 of the endoscope 3. On the endoscope 3, in an embodiment, at its rear part being closer to the eyepiece, a toothed wheel 9 of the endoscope 3 is fixedly mounted which is configured to cooperate with the movable toothed wheel 10. The movable toothed wheel 10, in an embodiment, is seated on the first end of a shaft 13, the shaft 13 being seated in the housing 6 in a manner to enable rotation, and preferably it is seated via a bearing (15). A person skilled in the art will be aware that there are possible various manned of bearing-attachment, such as the use of ball bearings, but also slide bearings are conceivable and it is possible to seat the shaft 13 directly in an opening of the housing, where the housing also has a function as a slide bearing. The movable toothed wheel 10 rotates inside the housing 6 of the endoscope when the endoscope 3 is rotated about its ow optical axis. The assembly for measurement of rotation of the endoscope 3 comprises a rotation sensor configured to measure rotation of the shaft 13. The assembly for measuring rotation of the endoscope 3 comprises an endoscope interface configured to transfer the measurement data from the rotation sensor. The endoscope interface is preferably in a form of an endoscope connector 18. Also preferably, the housing 6 of the endoscope 3 comprises a protrusion 8, and the protrusion 8 is intended to mount, in a manner that prevent the housing 6 of the endoscope 3 from rotation, of the endoscope assembly 1 to the endoscopic camera assembly 2. It should be noted that a person skilled in the art will be aware of other methods to attain the aim of preventing rotation of the endoscope assembly 1 relative to the endoscopic camera assembly 2.

The toothed wheel 9 and the movable wheel 10 are preferably oblique wheels, and the axis of the toothed wheel 9 and the axis of the movable toothed wheel 10 define in a preferable embodiment the right angle.

In a preferable embodiment, the rotation sensor comprises an encoder 17 and a magnet 14 applied on the second end of the shaft 13, which elements perform the function of the rotation sensor configured to measure rotation of the shaft 13. A person skilled in the art will be aware of other methods for measuring rotation of the shaft 13.

The encoder 17 in a preferable embodiment is seated on a printed circuit 16 of the endoscope 3 within the housing 6 of the endoscope 3. On the printed circuit 16 of the endoscope 3 there may be arranged an endoscope interface, preferably in a form or an endoscope connector 18. The endoscope interface is configured to transfer the measurement data from the rotation sensor, and it may also transfer the data stored in a non-volatile memory concerning optical and calibration parameters of the endoscope 3. The encoder 17 is seated directly beneath a magnet 14.

The endoscope assembly 1 may further comprise a play elimination mechanism between the toothed wheel 9 and the movable toothed wheel 10. The play elimination mechanism, as shown in a preferable embodiment, comprises a spring 12, preferably a spiral spring arranged for applying torque to the shaft 13 and the housing 6. Additionally, between the spring 12 and the shaft 13 there may be arranged a mounting pin 11, to which a spring is mounted 12. It should be emphasized that a person skilled in the art will be aware of other methods for elimination of play.

Additionally, the endoscope housing 6 may comprise a rotation limiting mechanism that prevents the endoscope 3 from making a full turn about its own axis relative to the housing 6. The rotation limiting mechanism may be implemented via an arm mounted perpendicularly to the axis of the endoscope 3 and an element parallel to the endoscope 3 and protruding above the arm. If the endoscope 3 comprises a fiber optic connection 4, the fiber optic connection 4 may perform the function of the arm. The rotation limiting mechanism prevents the endoscope 3 from making a full turn about its own axis relative to the housing 6 via mechanical contact of the portending element of the endoscope 3 with a rotation stop 7.

The endoscopic camera assembly 2 comprises a housing 29 of the camera where a sensor case 26 of a vision sensor 28 is arranged. The vision sensor 28, which may be positioned on a sensor printed circuit 27 inside the sensor case 26, is arranged opposite to the endoscope 3. The endoscopic camera assembly 2 also comprises a camera interface configured to transfer the data from the camera assembly, for example in a form of a camera connector 32.

The endoscopic camera assembly 2 also comprises an optical adapter 19 configured to connect, for example via a shaped connection by means of a protrusion 8, as shown in an embodiment, to the endoscope 3 of the endoscope assembly 1. This enables transfer of the image from the endoscope 3 to the vision sensor 28. It should be also noted that the optical adapter 19 prevents rotation of the endoscope assembly 1 relative to the axis of the endoscope 3, preferably via a shaped connection with the protrusion 8.

Onto the optical adapter 19 an adapter case 21 is fixedly mounted. The camera connector 32 may be arranged on the adapter case 21 or on the camera housing 29.

The endoscopic camera assembly 2 further comprises a sharpness adjustment knob 20 to enable free adjustment of sharpness by the user. The endoscopic camera assembly 2 is additionally configured to measure the position of the sharpness adjustment knob 20 and this is implemented by means of a knob position measurement assembly 20. It should be noted that the knob 20 may be made as one element or it may comprise a sharpness adjustment knob 20 and a sharpness adjustment knob cap 24 mounted thereon.

Also preferably, the endoscopic camera assembly 2 may comprise an accelerometer.

The assembly for the measurement of the position of the sharpness adjustment knob 20 may be implemented as a reflector 25 and a knob position sensor 23 configured to read out the position of the reflector 25. The knob position sensor 23 may be a vision sensor, for example a reflection sensor. The knob position sensor 23 in this configuration emits light and measures intensity of the light reflected from the reflector 25 arranged on the sharpness adjustment knob 20. The reflector 25 may be positioned on a sidewall of the sharpness adjustment knob 20 and it may be implemented as a sticker with variable optical parameters, e.g. a variable color or brightness, or as a furrow with a variable depth along a section of a circle. The knob position sensor 23 is thus used for measurement of the rotation angle of the sharpness rotation knob 20 and this information may be used for setting sharpness in a simulated training in a virtual reality scenario.

In a preferable embodiment the knob position sensor 23 is arranged within the adapter case 21, and preferably the knob position sensor and/or accelerometer are seated on a printed circuit 22 of the optical adapter. The optical adapter printed circuit 22 may be positioned for example in the adapter case 21.

The adapter interface arranged for receiving data from the endoscope interface and to transfer the received data to the camera interface, and preferably the adapter interface is positioned on the optical adapter printed circuit 22. Such a solution enables connecting, by means of one interface, the endoscope assembly 1 and the endoscopic camera assembly 2, to another device that receives data. It is possible to connect separately the endoscope assembly 1 and the endoscopic camera assembly 2 to a device that receives data but one interface that transfers all the data will make it easier to use the subject invention through simplification of the training system.

Additionally, to the camera housing 29 the camera printed circuit 30 is attached comprising camera press buttons 31 intended for controlling the endoscopic camera assembly 2. Nevertheless, it should be emphasized that the camera press buttons 31 do not have to be seated in a printed circuit board and they may be affixed directly to the camera housing 29. Moreover, on the optical adapter printed circuit 22 or the camera printed circuit 30 an accelerometer may be arranged to provide absolute measurement of the inclination angle of the endoscopic camera assembly 2 relative to the Earth and its absolute rotation angle about its own axis.

Upon connection of the endoscope assembly 1 and the endoscopic camera assembly 2 via the optical adapter 19, the connector 18 of the endoscope 3 is connected to the optical adapter printed circuit 22. The endoscopic camera assembly 2 may further comprise an adapter interface configured to receive data from the endoscope interface and to transfer the received data to the camera interface.

It should be noted that the printed circuit throughout the specification of the invention means a printed circuit board comprising suitable electronic components mounted on the printed circuit board, and not solely the printed circuit board as such.

What is claimed is:

1. An endoscope assembly comprising:
an endoscope comprising a fiber optic connection;
a housing of the endoscope;
an assembly for measuring rotation of the endoscope positioned within the housing of the endoscope, wherein a toothed wheel is fixedly attached on the endoscope, the toothed wheel configured to cooperate with a movable toothed wheel, wherein the movable toothed wheel is seated on a first end of a shaft, the shaft being seated on the housing in a manner preventing rotation,
wherein the assembly for measuring rotation of the endoscope comprises:
a rotation sensor configured to measure rotation of the shaft,
an endoscope interface, in a form of an endoscope connector configured to transfer measurement data from the rotation sensor.

2. The endoscope assembly according to claim 1 wherein the toothed wheel and the movable toothed wheel are oblique wheels and an axis of the toothed wheel and an axis of the movable toothed wheel define a right angle.

3. The endoscope assembly according to claim 1 wherein the rotation sensor comprises an encoder and a magnet applied on a second end of the shaft.

4. The endoscope assembly according to claim 3 further comprising a printed circuit of the endoscope that comprises an encoder and an endoscope interface.

5. The endoscope assembly according to claim 1 further comprising a mechanism for elimination of play between the toothed wheel and the movable toothed wheel, the play elimination mechanism comprising a spring, configured to apply torque to the shaft and housing, and between the spring and the shaft there is a mounting pin to which the spring is mounted.

6. The endoscope assembly according to claim 1 wherein a central axis of a field of view of the endoscope is parallel or angled relative to an axis of the endoscope.

7. The endoscope assembly according to claim 1 wherein the endoscope housing comprises a rotation limiting mechanism to prevent the endoscope from making a full turn about its own axis relative to the housing, of the rotation limiting mechanism comprising an arm mounted perpendicularly to an axis of the endoscope and an element parallel to the endoscope protruding above the arm, wherein the arm is a fiber optic connection.

* * * * *